(12) United States Patent
Sorensen et al.

(10) Patent No.: US 7,770,498 B2
(45) Date of Patent: Aug. 10, 2010

(54) MODULAR TOOL CARRIER FOR BORING MACHINE

(75) Inventors: David Loyd Sorensen, Sherwood, OR (US); David S. Strait, Lyle, WA (US); Andrew Thompson, Hendersonville, NC (US)

(73) Assignee: Climax Portable Machine Tools Inc., Newberg, OR (US)

( * ) Notice: Subject to any disclaimer, the term of this patent is extended or adjusted under 35 U.S.C. 154(b) by 840 days.

(21) Appl. No.: 11/531,603

(22) Filed: Sep. 13, 2006

(65) Prior Publication Data

US 2008/0060490 A1    Mar. 13, 2008

(51) Int. Cl.
 *B23B 41/00* (2006.01)
(52) U.S. Cl. .............................. 82/1.4; 82/1.2; 82/113; 408/181
(58) Field of Classification Search .................. 82/1.11, 82/1.2, 1.4, 127, 129, 113; 29/38 B; 408/79, 408/80, 81, 181
See application file for complete search history.

(56) References Cited

U.S. PATENT DOCUMENTS

| | | | | |
|---|---|---|---|---|
| 2,769,234 A * | 11/1956 | Young | ........................... | 30/97 |
| 4,164,381 A * | 8/1979 | Lovendahl | ................... | 408/20 |
| 4,580,931 A * | 4/1986 | Wilger et al. | ............. | 408/72 R |
| 4,739,685 A * | 4/1988 | Ricci | ............................ | 82/113 |
| 5,030,041 A * | 7/1991 | Marron | ....................... | 408/83.5 |
| 5,642,969 A * | 7/1997 | Strait | ......................... | 408/124 |
| 5,660,093 A * | 8/1997 | Ricci | ............................ | 82/113 |
| 5,881,618 A * | 3/1999 | Ricci et al. | ..................... | 82/128 |
| 5,894,772 A * | 4/1999 | Nodar | ......................... | 82/113 |
| 5,992,277 A * | 11/1999 | Dalseide | ...................... | 82/130 |
| 6,065,378 A * | 5/2000 | Ricci | ............................ | 82/128 |
| 6,619,164 B1 * | 9/2003 | Ricci et al. | ..................... | 82/113 |
| 6,799,494 B1 * | 10/2004 | Ricci et al. | ..................... | 82/113 |
| 6,901,828 B2 * | 6/2005 | Ricci | ............................ | 82/113 |
| 6,990,878 B2 * | 1/2006 | Ricci et al. | ..................... | 82/123 |
| 7,069,829 B2 * | 7/2006 | Ricci et al. | ..................... | 82/113 |
| 7,168,452 B2 * | 1/2007 | Sasaki et al. | ................. | 138/110 |
| 2003/0127851 A1 * | 7/2003 | Guslick et al. | .............. | 285/112 |
| 2005/0075221 A1 * | 4/2005 | Fond | ........................... | 482/93 |

FOREIGN PATENT DOCUMENTS

JP          62084909 A * 4/1987

* cited by examiner

*Primary Examiner*—Jason Daniel Prone
*Assistant Examiner*—Jennifer Swinney
(74) *Attorney, Agent, or Firm*—Schwabe, Williamson & Wyatt (57) ABSTRACT

Embodiments of the present invention provide a boring bar tool including a tool carrier adapted to translate along a boring bar. Adjustable guide members may be coupled with the tool carrier and adapted to contact the boring bar. The guide members may also be adapted to sufficiently support the tool carrier on the boring bar.

14 Claims, 5 Drawing Sheets

MODULAR TOOL CARRIER FOR BORING MACHINE

TECHNICAL FIELD

Embodiments of the present invention relate to the field of machine tools, more specifically, to a modular tool adapted to fit on a boring bar.

BACKGROUND

Portable boring bars typically comprise an elongated, cylindrical bar that is journaled for rotation in a frame attachable to a work piece. One class of portable boring bars, identified as a "traveling-head" style, employs a tool carrier that can be controlled to traverse the length of the boring bar. During operation, a first drive member rotates the bar while a second drive member actuates the axial position of the traveling-head tool carrier by means of a lead screw. A cutting tool bit attaches to the tool carrier to facilitate various boring and facing metal working applications.

Traditionally, tool carriers are designed to achieve a minimal clearance fit between the internal bore of the tool carrier and the outer circumference of the boring bar. It is desirable to minimize this clearance to help to provide tool bit stability and to minimize deflection and chatter during machining operations. To achieve this minimized clearance, it is typical to require tight tolerances on the deviation from the ideal sizes of the mating parts of the boring bar and tool carrier as they are manufactured. Frequently, it is necessary to "hand fit" the parts to achieve the desired clearance. In addition to making the parts costly to produce, a limitation of the custom-fitting process is that a given tool carrier becomes dedicated to the boring bar for which it was customized due to manufacturing size variations between various boring bars.

An additional drawback to the traditional tool carrier design is that it is difficult to compensate for wear that may occur over time.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)", that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
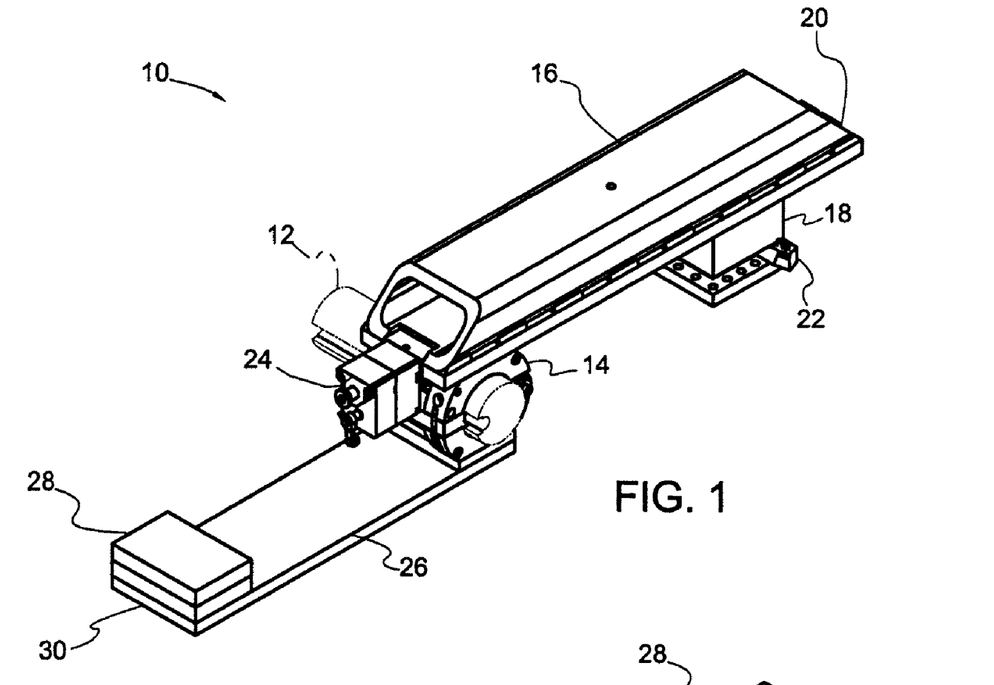
FIG. 1 illustrates a perspective view in accordance with various embodiments of the present invention.
Figure 2:
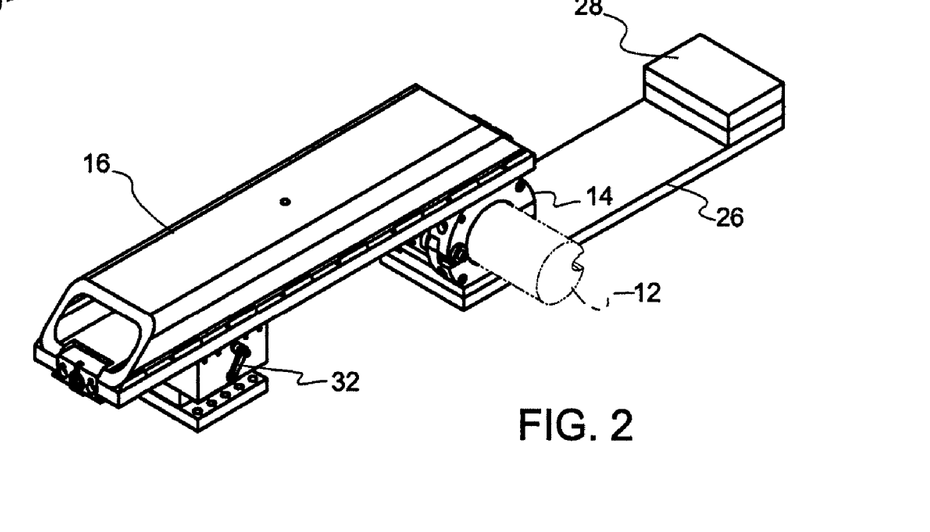
FIG. 2 illustrates a perspective view of FIG. 1.

FIG. 1 is a perspective view and FIG. 2 is a reverse angle perspective view of various embodiments according to the invention. A tool 10 may be adapted to couple with a boring bar 12 illustrated as a reference with phantom lines. The tool 10 may include a tool carrier 14 adapted to couple with the boring bar 12 and adapted to couple with a slide arm 16. The slide arm 16 may be adapted for rotation with the boring bar 12. A tool holder block 18 may be secured on a distal end 20 of the slide arm 16 and may be adapted to hold a cutting tool bit 22. The slide arm 16 may be adapted for gross adjustment on the tool carrier 14. The tool holder block 18 may be adapted for fine adjustment on the slide arm 16. In various embodiments fine adjustment may be effected by a feed box 24. The feed box 24 may be adapted to couple with the tool holder block 18 via a slide arm lead screw (not shown). In other embodiments the radial adjustment of the tool holder block 18 may be accomplished in a variety of ways, including, but not limited to mechanical actuation, pneumatic actuation, and/or hydraulic actuation. In various embodiments the power sources listed, as well as others, may be controlled by wirelessly.

The tool 10 may include an onboard self axial actuation contained power source (such as a battery) on the tool carrier adapted to provide power to move a tool normal to an axis of the boring bar and adapted to be controlled with, for example, a wireless remote controller. Actuation can be accomplished in a variety of ways.

In various embodiments the slide arm 16 may be of a known configuration and may include dovetail contacts (not shown). The dovetail contact may also be of a known configuration and may be adapted to couple with the tool carrier 14 via dovetail contacts. It may further be adapted to couple with dovetail features on the tool carrier 14 which are not shown in FIG. 1 and FIG. 2 but are discussed in more detail herein below. The tool block holder 18 may also be adapted to couple with the dovetail contacts on the slide arm 16.

In various embodiments, a counterweight arm 26 may be adapted to couple with an opposite side of the tool carrier 14. This coupling may also be via a dovetail feature/dovetail contact arrangement (not shown). The counterweight arm 26 may include a counterweight 28 at a distal end 30 thereof. The counterweight arm 26 may be adapted for radial adjustment on the tool carrier 14 and may be adapted to adjustably balance the weight of the slide arm 16 and tool block holder 18 combination. Various embodiments may couple two slide arms 16 to respective opposite sides of the tool carrier 14 to, for example, increase the material removal capability of the machine.

The tool block holder 18 may include a brake (not shown) that may be adapted for manual actuation via, for example, a brake handle 32. The brake may, for example, include adjustable members adapted to eliminate any clearance between the dovetail features/dovetail contacts to bind the tool holder to the slide arm.

Figure 3:
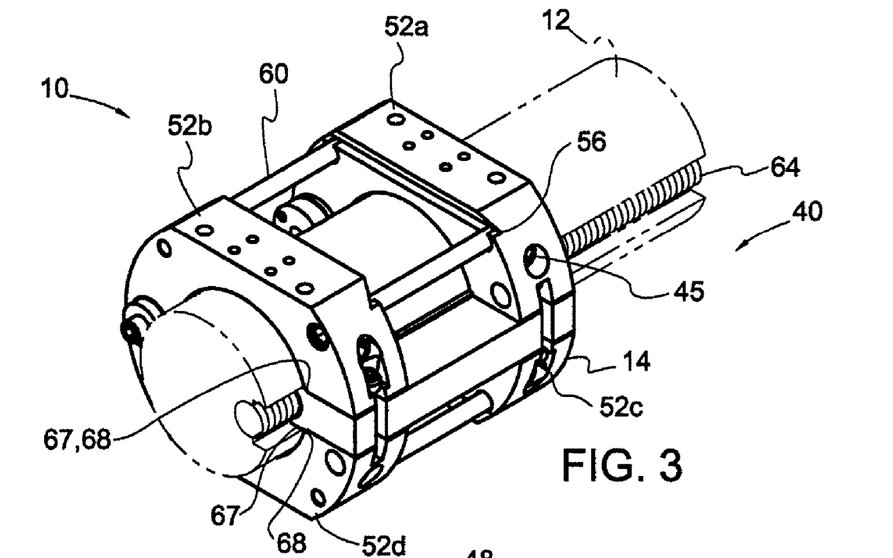
FIG. 3 illustrates a detailed perspective view of portions of FIGS. 1 and 2 in a first position.
Figure 4:
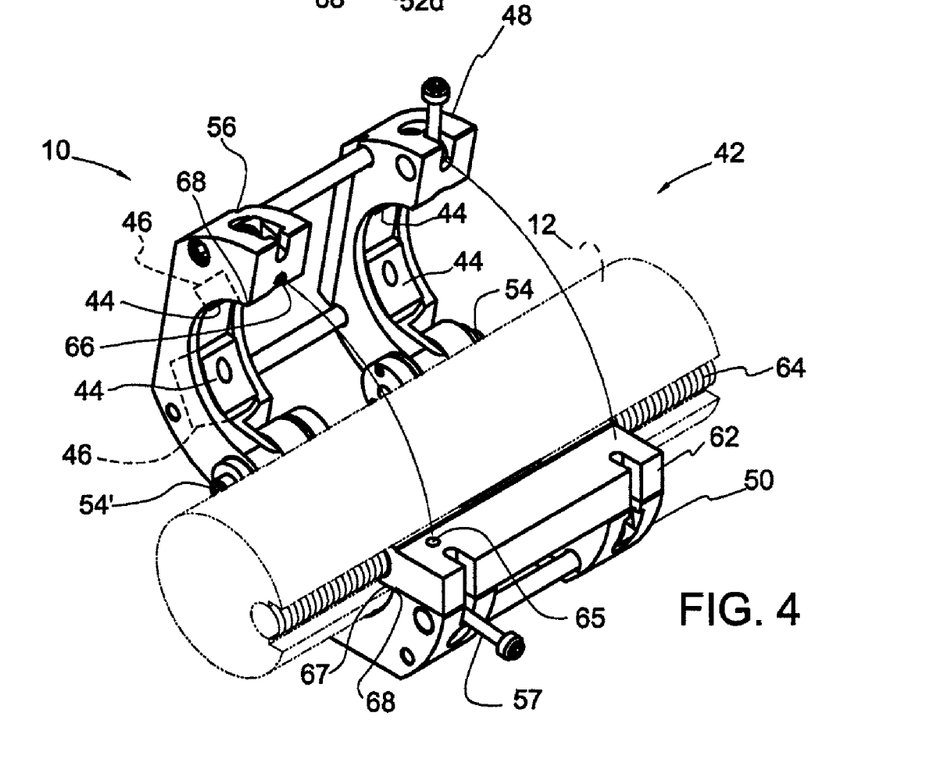
FIG. 4 illustrates a detailed perspective view of portions of FIGS. 1 and 2 in a second position.

FIG. 3 and FIG. 4 are perspectives views illustrating various embodiments according to the present invention. FIG. 3 illustrates a tool 10 in a first position 40, and FIG. 4 illustrates the tool 10 in a second position 42. The tool 10 may include a tool carrier 14 adapted to translate along a boring bar 12. Adjustable guide members 44 may be coupled to the tool carrier 14 and may be adapted to contact the boring bar 12. The guide members 44 may be adapted to support the tool carrier 14 on the boring bar 12 in a sufficiently rigid manner. In various embodiments, the guide members may be automatically adjusted and/or adjusted by an operator.

Adjustable guide members 44 may be of a variety of materials, including, but not limited to materials having desired friction properties. In various embodiments, the adjustable guide members may be of a material that has a low coefficient of friction with respect to the boring bar material, such that axial movement between the guide members and the bar is relatively free. In one embodiment, the guide members may be made of a bronze or bronze bearing alloy. Other alloys, plastics or substantially rigid materials may be used with various embodiments.

The tool 10 may include cheek pieces 52a, 52b, 52c, and 52d. The cheek pieces 54a-d may be adapted to house guide members 44. The tool carrier 14 may include coupling members 60 adapted to couple the respective spaced apart cheek pieces 52a and 52b and 52c and 52d to one another. In various embodiments, fewer or more cheek members may be used, and may include no spacing, larger and/or smaller spacing than that which is illustrated in the example embodiment.

The tool carrier 14 may be referred to as a "traveling-head." The guide members 44 may be designed to bear directly on the surface of the boring bar 12 during machining operations, and may be adjustable by the operator to manipulate and/or achieve a desired minimal clearance to the boring bar 12. In various embodiments, the tool carrier 14 may include pockets 46 adapted to retain the guide members 44 for movement toward and away from the boring bar 12. A guide member adjustment member 45 may be adapted to adjust the guide members 44 relative to the guide bar as needed to help maintain machining rigidity and stability.

In various embodiments, the guide members may be positioned such that there is relatively zero clearance with respect to the boring bar, which can help prevent axial movement of the tool carrier. Such embodiments may be useful in facing operations, for example, where axial movement of the tool carrier with respect to the boring bar is not desirable.

In some embodiments, the guide members may be biased towards the boring bar (e.g. using a spring or elastomeric member) alone or in addition to the use of adjustment members 45 in order to help maintain machining rigidity and stability. Various embodiments may provide rigid tool bit support and may also be economically advantageous to manufacture because they may allow the tolerances of the mating surfaces between the boring bar and the tool carrier to be relatively more relaxed than prior boring bar and tool carrier combinations.

Various embodiments may include various numbers of guide members 44. By way of example, the embodiments illustrated may include eight guide members 44 in eight pockets 46, each may be located in portions of the cheek pieces 52a-d. Other locations for the guide members are also possible. For example, various embodiments may include two spaced-apart guide members in one cheek piece 52a and a third centrally located in the mating cheek piece 52c to place three guide members 44 at an approximately 120° circumferential spacing, somewhat in a tripod fashion. Another three guide members 44 may be similarly arranged but inverted in the other side of the tool carrier 14, i.e., in cheek pieces 52b and 52d.

Various embodiments may be constructed as a modular tool 10 or a modular assembly 10, which may simplify installation and use. The tool 10 may comprise a tool carrier 14 having a first portion 48 and a second portion 50 that may be hingeably coupled and adapted to fit over the boring bar 12. In one embodiment, for example, the cheek pieces 52a-52d may be hingeably coupled in pairs with a first hinge 54 and a second hinge 54'.

In various embodiments, each top cheek piece 52a and 52b may include dovetail cutouts 56 adapted to receive machining accessories. The machining accessories may be selected from the group consisting of tool holders (not shown), spacer blocks (not shown), slide arms 16 (FIG. 1), and counterweight arms 26 (FIG. 1), and other accessories to suit the desired machining operation. To reposition an accessory that is clamped in the dovetail cutouts 56, it may be easily accomplished by loosening the coupling members 60 and sliding the component to the new desired position. In various embodiments the rotating slide arm assembly may be used for both boring and facing operations.

Embodiments may enable an operator to clamp the tool carrier 14 to the boring bar 12, and to face large diameters or other applications which require superior stability. Various embodiments may replace the coupling members 60 with longer coupling members 60 disposing the dovetail cutouts 56 to couple with a wider slide arm, and disposing the guide members 44 to provide a wider stance on the boring bar 12.

Once the tool carrier 14 is mounted and the top cheek pieces 52a and 52b are closed around the boring bar 12, latch members 57 may be swung into position and may be fastened to secure the assembly in place. The latch members 57 may separate from or made integral with respective cheek piece pairs 52a/52c and 52b/52d. In various embodiments, other latch members may be used to secure the tool carrier around the boring bar.

The tool 10 may further comprise a drive key 62 adapted to threadably engage a lead screw 64 disposed in the boring bar 12, such that when engaged, rotation of the lead screw may cause axial movement of the tool carrier. The first portion 48 and the second portion 50 of the tool carrier 14 may be adapted to clamp over the drive key 62. The latch members 57 may be adapted to couple the first portion 48 to the second portion 50, and may be adapted to span across the drive key 62.

Referring still to FIGS. 3 and 4, in various embodiments, a portion of the drive key 62 may be substantially registered or located radially and axially with respect to one pair of cheek pieces, whereas another portion of the drive key may be adapted to generally float with respect to another set of cheek pieces. In a preferred embodiment, this floating of a portion of the drive key may be substantially restrained such that it is substantially located radially but allowed to float axially with respect to a set of cheek pieces. Such axial float allowance may enable the tool carrier to adapt to various conditions that may naturally or unnaturally arise during operation.

In one embodiment, the portion of the drive key and cheek piece that are to be located axially and radially may be done using a variety of known locating arrangements. In one example, a pin 66 may be coupled to cheek piece 52b, and adapted to engage receiver 65 in drive key 62. The same type of arrangement may be disposed on the other side of the portion of the drive key that is to be located axially and radially, though is not shown in the illustrated embodiment. When assembled, the locating arrangement may serve to register one portion of the drive key 62 relative to the other components of the assembly. Because the locating arrangement is configured to generally hold only one end of the drive key 62 in place relative to cheek pieces 52b and 52d, the other portion of the drive key 62 may be allowed to generally float and/or move relative to the cheek pieces 52a and 52c. In various embodiments, such fixing and floating arrangement may allow the coupling members 60 to be loosened such that an accessory may be adjusted in the dovetail cutouts 56 as described.

In various embodiments, with the drive key 62 generally registered relative to one set of cheek pieces, floating portion of the drive key 62 may be restrained in the radial direction (relative to the centerline axis of the boring bar) by using a notch and step arrangement, for example, which would still allow for some axial float. In one embodiment, the radial location may include the cheek pieces having a notch 67 that is adapted to generally mate with a step 68 disposed on the drive key 62. When the tool carrier is in the operating configuration (illustrated in FIG. 3), the drive key may be generally restrained from moving in the radial direction by virtue of the radial location, yet the portion of the drive key that is not registered using a fixing arrangement as discussed above, may still float axially to some degree. Various embodiments may utilize a variety of radial location configurations other than that as previously described. Further, the notch and steps may be disposed on different components and in different locations as desired.

Figure 5:
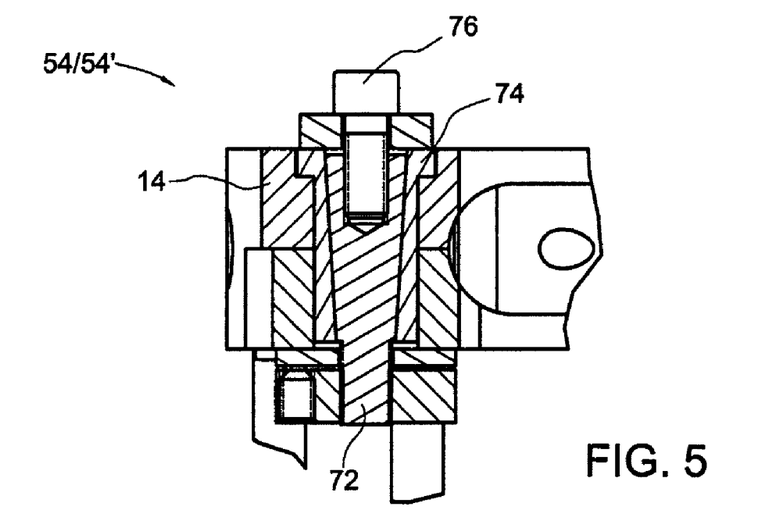
FIG. 5 illustrates a cross-sectional view of a hinge detail according to various embodiments of the invention.

Various embodiments may include a locking hinge arrangement adapted to reduce or eliminate movement between the cheek pieces. FIG. 5 is a cross-sectional view illustrating details of one possible hinge arrangement 54/54' according to embodiments of the invention. A taper expansion pin 72 may be disposed for axial displacement with in a split taper sleeve 74. As the taper expansion pin 72 moves in toward the split taper sleeve 74 it will tend to expand and lock the cheek pieces together. A retract screw 76 is disposed to effect the axial movement of the taper expansion pin within the split taper sleeve.

Figure 6:
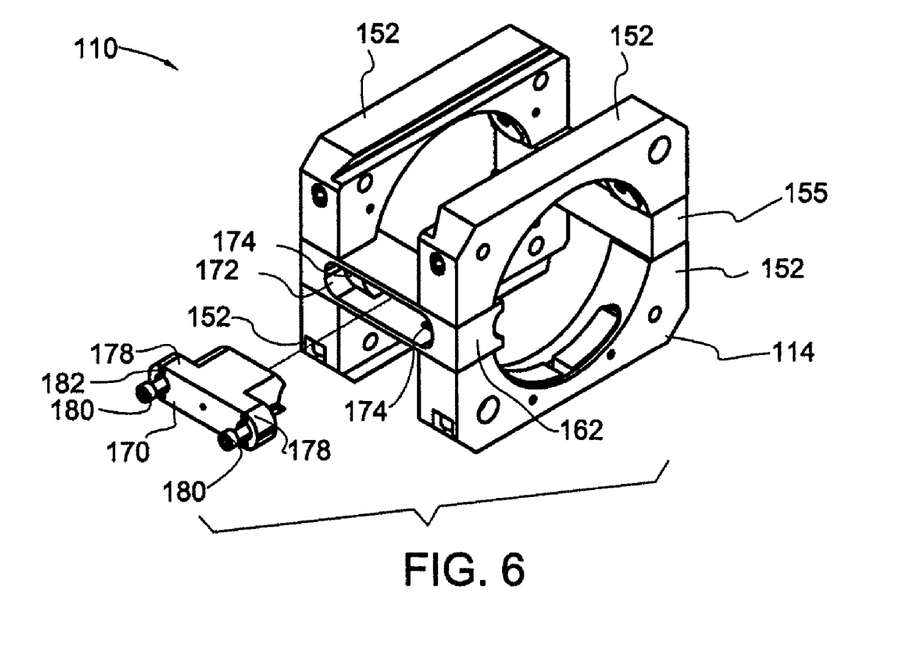
FIG. 6 illustrates a perspective view of various embodiments of the invention.

FIG. 6 is an exploded perspective view illustrating various embodiments according to the invention. A tool 110 may include a tool carrier 114 having cheek pieces 152 coupled at a first side with a coupling member 155, which may be a hinge. The cheek pieces 152 may also be coupled at second end via a drive key 162. The drive key 162 may include a half nut 170 adapted to threadably couple with a lead screw (not shown). In various embodiments, the half nut or other member may be adapted to be removably coupled to the drive key to allow for either an engaged or disengaged arrangement.

In various embodiments, the half nut 170 may be further adapted to disengage from the lead screw. The half nut 170 may include coupling flanges 178. The drive key 162 may include a corresponding cavity 172 having interior shoulders 174. The half nut 170 may be adapted to fit within the cavity 172 and to couple with the drive key 162 via the coupling flanges 178. Retaining screws 180 may be adapted to hold the half nut 170 within the cavity 172 by coupling the coupling flanges 178 to the shoulders 174. One or more backlash adjustment screws 182 may extend through the coupling flanges 178 and may be adapted to adjust the interpositional relationship between the threads of the half nut 170 and the lead screw.

Various embodiments may be equipped with, or adapted to receive various half nuts. Each half nut may be adapted for various lead screw to boring bar spacings, as well as accommodate differing lead screw and boring bar configurations. Various embodiments may allow an operator to adjust the clearance to the lead screw to compensate for wear and to minimize backlash by for example adjusting the one or more backlash adjustment screws 182.

A removable half nut or other lead screw engaging member may also allow the capability of removing the half nut from the tool carrier assembly without disturbing the mounting setup on the boring bar. This may have the effect of disengaging the axial movement of the tool carrier along the boring bar lead screw even while the lead screw rotates and, may place the tool carrier 114 in "neutral" position. The ability to disengage the axial feed is an advantage for those machining applications that require multiple tool carriers on a single boring bar, for example. Various other embodiments may, also or instead, include a drive key adapted to disengage from the lead screw while the tool carrier remains stationary relative to the boring bar. Various other embodiments may include drive keys not adapted to disengage from the lead screw.

Figure 7:
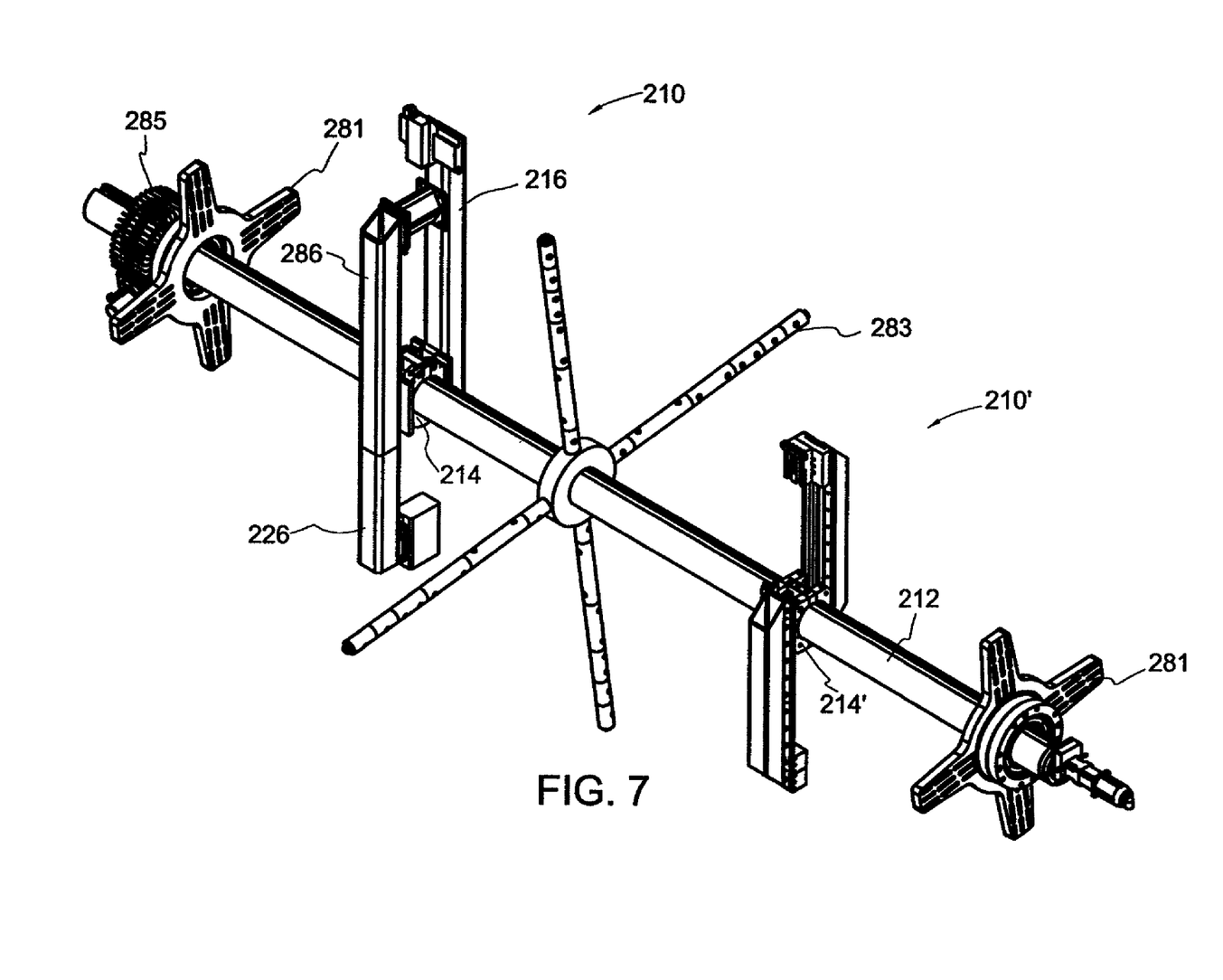
FIG. 7 illustrates a perspective view of various embodiments of the invention.

FIG. 7 is a perspective view illustrating various embodiments according to the invention. Multiple tools 210 and 210' for example two tools may be positioned on a boring bar 212. One tool 210' may be adapted for boring and may therefore have a half nut (not shown) that is engaged with a lead screw on the boring bar 212 such that the tool carrier 214' may be advanced axially along the boring bar 212 upon rotation of the lead screw. The other tool 210 may have its half nut (not shown) disengaged from the threads of the lead screw and/or removed completely from the work space such that the tool carrier 214 will not advance when the lead screw is turned. Such embodiments may be used to both bore and face at the same time. Other features illustrated include: end supports 281 which may hold the setup in place on the work-piece; jacking legs 283 which may reduce boring bar 212 sag; and a rotational drive unit 285.

As previously discussed, the use of a counterweight arm may help to balance the weight of the rotating slide arm to achieve uniform rotational cutting speeds during machining and reduce vibrations. As an option, a brace 286 can be used to tie a counterweight arm 226 to the rotating slide arm 216. The brace structure may be used to help provide rigidity to the rotating slide arm 216, and may be particularly useful in providing tool stability when machining large diameters.

Figure 8:
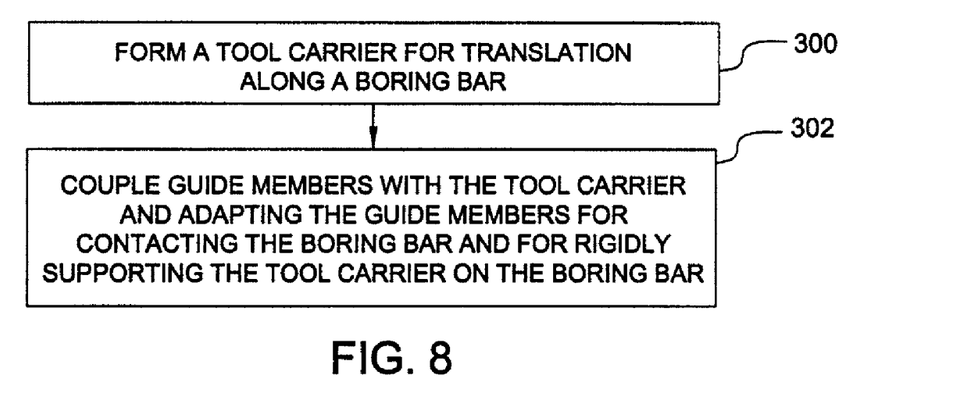
FIGS. 8 and 9 illustrate various methods for use to practice various embodiments of the present invention.

FIG. 8 illustrates various embodiments according to the invention may include a method comprising:

forming a tool carrier for translation along a boring bar 300; and coupling guide members with the tool carrier and adapting the guide members for contacting the boring bar and for supporting the tool carrier on the boring bar, 302 during operation.

Figure 9:
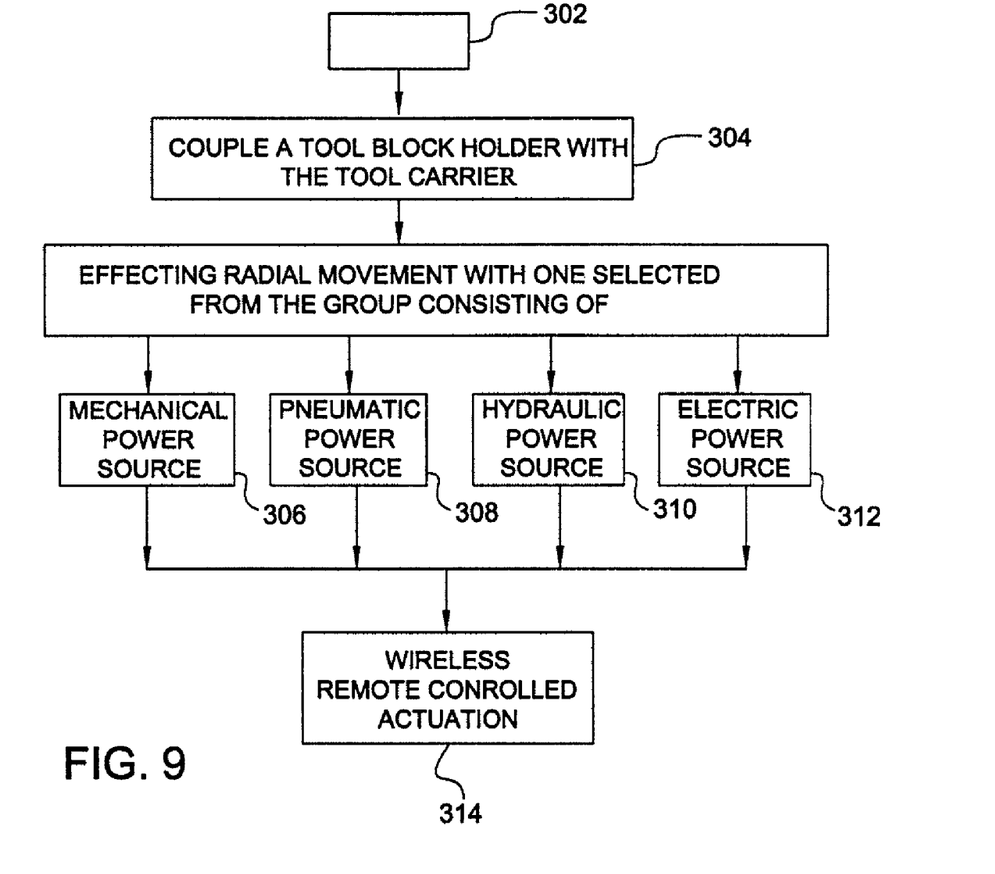

FIG. 9 illustrates other embodiments wherein the method may further comprise:

coupling a tool block holder with the tool carrier, 304;

adapting the tool block holder for radial movement normal to an axis of the boring bar, the radial movement actuating/ power source being, for example:

mechanically actuating a radial arm lead screw coupled with the tool block holders, 306;

pneumatically actuating the radial arm lead screw coupled with the tool block holders, 308;

hydraulically actuating a radial arm lead screw coupled with the tool block holders, 310;

electrically actuating a radial arm lead screw coupled with the tool block holders, 312; and remotely controlling the radial movement of the tool block holder, 314.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A tool carrier, comprising:
    a first portion and a second portion adapted to releasably engage a boring bar;
    a plurality of adjustable guide members adjustably coupled to the first portion and the second portion and configured to support a tool carrier on the boring bar, wherein the plurality of adjustable guide members are radially adjustable relative to the boring bar to enable selective axial movement along the boring bar and stability for a machining tool during a machining operation; and
    a drive key configured to threadably engage a lead screw on the boring bar, the first portion and the second portion adapted to help retain the drive key.

2. The tool carrier of claim 1, further comprising:
    one or more pockets in the first portion and the second portion adapted to retain the plurality of adjustable guide members for movement generally toward and/or away from the boring bar.

3. The tool carrier of claim 1, further comprising:
    a plurality of cheek pieces coupled to the first portion and the second portion and configured to receive the machining tool; and
    one or more coupling members coupled to the plurality of cheek pieces, wherein the one or more coupling members are configured to facilitate positioning of the machining tool with respect to the tool carrier.

4. The tool carrier of claim 3, wherein the cheek pieces have dovetail cutouts adapted to receive a machining tool from a group consisting of:
    tool holders;
    spacer blocks;
    slide arms; and/or
    counterweight arms.

5. The tool carrier of claim 3, wherein the one or more coupling members are further configured to couple the plurality of cheek pieces to one another, and wherein the machining tool is positioned proximal to the plurality of cheek pieces in dovetail cutouts.

6. The tool carrier of claim 3, wherein the plurality of cheek pieces are configured to receive a first machining tool that has a first size, and subsequently, a second machining tool that has a second size, the first size being different than the second size.

7. The tool carrier of claim 1, wherein the first portion and the second portion are hingeably coupled together and adapted to close generally around the boring bar.

8. The tool carrier of claim 1, further comprising at least one latch member adapted to couple the first portion to the second portion of the tool carrier, and adapted to span at least a portion of the drive key.

9. The tool carrier of claim 1, wherein the drive key is adapted to disengage from the lead screw to allow the tool carrier to remain stationary relative to the boring bar, and wherein the one or more adjustable guide members are adjustable relative to the boring bar to prevent axial movement.

10. The tool carrier of claim 1, wherein the drive key is statically coupled to the first portion and the second portion at a first end and radially coupled to the first portion and the second portion at a second end.

11. The tool carrier of claim 3, further comprising a slide arm adapted to slideably couple with the plurality of cheek pieces and adapted to support a tool block holder for radial adjustment substantially normal to an axis of the boring bar.

12. A modular tool, comprising:
    a first portion coupled to a second portion, wherein the first portion and the second portion are configured to generally encircle a boring bar;
    a plurality of guide members, coupled to the first portion and the second portion, wherein the plurality of guide members are configured for adjustment relative the to boring bar, wherein the plurality of guide members permit selective axial movement of the first portion and the second portion along the boring bar when adjusted to contact the boring bar; and
    a removable drive key having a threaded portion adapted to threadably engage a lead screw on the boring bar wherein the drive key is disposed between the first portion and the second portion.

13. The modular tool of claim 12, wherein each of the first portion and the second portion includes two spaced-apart cheek pieces adapted to carry the guide members.

14. The modular tool of claim 13, wherein the cheek pieces have adjustable dovetail cutouts adapted to receive machining accessories from the group consisting of:

tool holders;
spacer blocks;
slide arms; and/or
counterweight arms.

* * * * *